(12) United States Patent
Schneider

(10) Patent No.: US 10,139,212 B2
(45) Date of Patent: Nov. 27, 2018

(54) COMBINATION TAPE MEASURE AND MARKER

(71) Applicant: Omer Schneider, Norman, OK (US)

(72) Inventor: Omer Schneider, Norman, OK (US)

( * ) Notice: Subject to any disclaimer, the term of this patent is extended or adjusted under 35 U.S.C. 154(b) by 0 days.

(21) Appl. No.: 15/661,182

(22) Filed: Jul. 27, 2017

(65) Prior Publication Data
US 2017/0322008 A1    Nov. 9, 2017

Related U.S. Application Data

(63) Continuation-in-part of application No. 14/731,653, filed on Jun. 5, 2015, now Pat. No. 9,746,301.

(51) Int. Cl.
*G01B 3/10* (2006.01)

(52) U.S. Cl.
CPC ......... *G01B 3/1084* (2013.01); *G01B 3/1041* (2013.01); *G01B 2003/1089* (2013.01)

(58) Field of Classification Search
CPC .................. G01B 3/1084; G01B 2003/1089
USPC .......................................................... 33/668
See application file for complete search history.

(56) References Cited

U.S. PATENT DOCUMENTS

| | | |
|---|---|---|
| 2,882,601 A | 4/1959 | Edward |
| 2,906,024 A | 9/1959 | Smith |
| 3,148,455 A | 9/1964 | Aciego |
| 3,336,678 A | 8/1967 | Chamberlain et al. |
| 3,731,389 A | 5/1973 | King |
| 3,802,083 A | 4/1974 | Freed |
| 4,015,337 A | 4/1977 | Taylor |
| 4,439,927 A | 4/1984 | Elliott |
| 4,542,589 A | 9/1985 | Yamamoto |
| 4,630,376 A | 12/1986 | Pentecost |
| 4,766,673 A | 8/1988 | Bolson |
| 4,965,941 A | 10/1990 | Agostinacci |
| 5,416,978 A | 5/1995 | Kaufman |
| 5,435,074 A | 7/1995 | Holevas et al. |
| 5,815,939 A * | 10/1998 | Ruffer .................. G01B 3/1084 33/760 |
| 5,992,038 A * | 11/1999 | Harmon ............... G01B 3/1084 33/668 |
| 6,434,854 B1 | 8/2002 | MacColl et al. |
| 6,880,260 B2 | 4/2005 | Baida |
| 7,269,913 B2 | 9/2007 | Holevas |
| 8,464,436 B2 | 6/2013 | Smith |
| 9,746,301 B2 * | 8/2017 | Schneider ............ G01B 3/1084 |

(Continued)

*Primary Examiner* — Christopher Fulton
(74) *Attorney, Agent, or Firm* — Global Intellectual Property Agency, LLC; Daniel Boudwin

(57) ABSTRACT

A combination tape measure and marker is provided. The combination tape measure and marker includes a measuring tape housing having a lateral portion, a lower portion, and a front portion. A track is connected to the lateral portion of the measuring tape housing. An arm is slidably disposed within the track. A tension member having an arcuate shape can slide the arm towards the lower portion when depressed. A cartridge is integrally attached to the front portion of the measuring tape housing. The arm extends through the cartridge. A marker is removably secured within the cartridge and is operationally attached to the arm. A spring is housed in the cartridge and provides a retracted and extended position for the marker. The marker is movably separately and independently from the measuring tape housing by selectively depressing the arm.

9 Claims, 3 Drawing Sheets

(56) References Cited

U.S. PATENT DOCUMENTS

| | | | | |
|---|---|---|---|---|
| 2001/0034953 A1* | 11/2001 | Cole, III | ............... | B43L 9/04 |
| | | | | 33/668 |
| 2004/0123479 A1* | 7/2004 | Tufts | ............... | G01B 3/1084 |
| | | | | 33/768 |
| 2005/0047844 A1* | 3/2005 | Lammers | ............... | B43K 8/003 |
| | | | | 401/108 |
| 2007/0220770 A1* | 9/2007 | Brown | ............... | G01B 3/1084 |
| | | | | 33/668 |
| 2011/0239479 A1 | 10/2011 | Chisholm et al. | | |

* cited by examiner

COMBINATION TAPE MEASURE AND MARKER

CROSS REFERENCE TO RELATED APPLICATIONS

This application is a continuation-in-part and claims the benefit of U.S. application Ser. No. 14/731,653 filed on Jun. 5, 2015 now U.S. Pat. No. 9,746,301. The above identified patent application is herein incorporated by reference in its entirety to provide continuity of disclosure.

BACKGROUND OF THE INVENTION

The present invention relates to measuring devices. More particularly, the present invention relates to a tape measure having a marking device integrally attached to the measuring tape housing for providing precise marking of a measurement, wherein the marker is extendable via a slide and spring system.

Various types of tape measures are available for the purpose of measuring a surface. Typically, a user tends to measure a given surface with the help of a tape measure and mark the surface as per the measurement with the help of a tool such as a pencil, pen, marker or the like. The user may utilize both hands in order to hold the tape measure for taking a correct measurement of the surface. However, the user may not be able to mark the surface with exact precision while his/her hands are engaged in holding the tape measure. Accordingly, the user may require assistance from another person for marking the surface as measured by the tape measure. Further, incorrect measurements may be taken when an attempt is made by a single individual to measure the surface and simultaneously mark the device. The current invention goes beyond the known art to provide a combination tape measure and marker including a marker removably secured within a cartridge that is integrally attached to the tape measure housing, wherein the marker is operationally attached to the slide.

In light of the devices disclosed in the known art, it is submitted that the present invention substantially diverges in design elements from the known art and consequently it is clear that there is a need in the art for an improvement to existing measuring devices. In this regard, the instant invention substantially fulfills these needs.

SUMMARY OF THE INVENTION

In view of the foregoing disadvantages inherent in the known types of measuring devices now present in the prior art, the present invention provides an improved combination tape measure and marking device wherein the same can be utilized for providing convenience for the user when marking a specific length corresponding to the measuring tape.

It is therefore an object of the present invention to provide a new and improved combination measuring tape and marking device that has all of the advantages of the known art and none of the disadvantages.

It is another object of the present invention to provide a combination tape measure and marker including a measuring tape housing having a lateral portion, a lower portion, and a front portion, wherein a track is connected to the lateral portion having an arm slidably disposed therein that is adapted to deploy a marking apparatus.

It is yet another object of the present invention to provide a combination tape measure and marker including a cartridge integrally attached to the front portion of the measuring tape housing. The arm extends through the cartridge.

Another object of the present invention is to provide a combination tape measure and marker including a marker removably secured within the cartridge that is operationally attached to the arm. A spring is housed in the cartridge and provides a retracted and extended position for the marker. The marker is movable separately and independently from the measuring tape housing by selectively depressing a tension member to extend the marker to mark a surface.

Yet another aspect of the present invention is to provide a combination tape measure and marker wherein the marker is a felt tip pen, pencil, metal tip pen, or other marking apparatus. The marker tip aligns with a measurement line at the front portion of the tape measure housing when the extended position.

It is another aspect of the present invention to provide a combination tape measure and marker wherein the cartridge comprises a removably ink cartridge.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
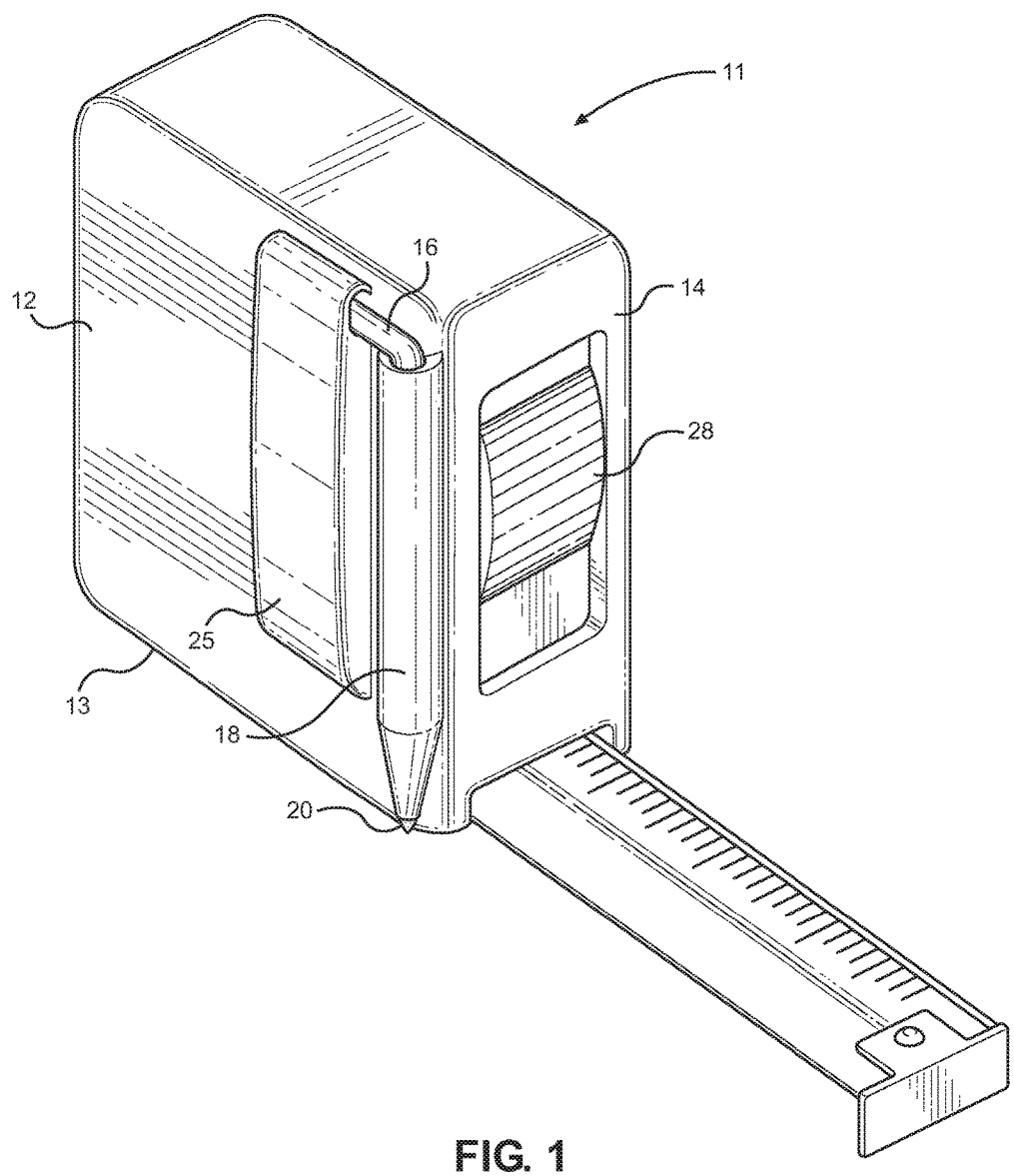
FIG. 1 shows a perspective view of an embodiment of the tape measure in combination with a marker.

Reference is made herein to the attached drawings. Like reference numerals are used throughout the drawings to depict like or similar elements of the combination tape measure and marking device. The figures are intended for representative purposes only and should not be considered to be limiting in any respect.

Referring now to FIG. 1, there is shown a perspective view of an embodiment of the tape measure in combination with a marker. The combination tape measure and marking device includes a measuring tape housing 11 having a lateral portion 12 and a front portion 14. In some embodiments, the measuring tape housing 11 further comprises a conventional locking slide 28 to lock the measuring tape at an extended length. Additionally, the measuring tape housing 11 contains a recoiled measuring tape within the body of the measuring tape housing 11.

Figure 2A:
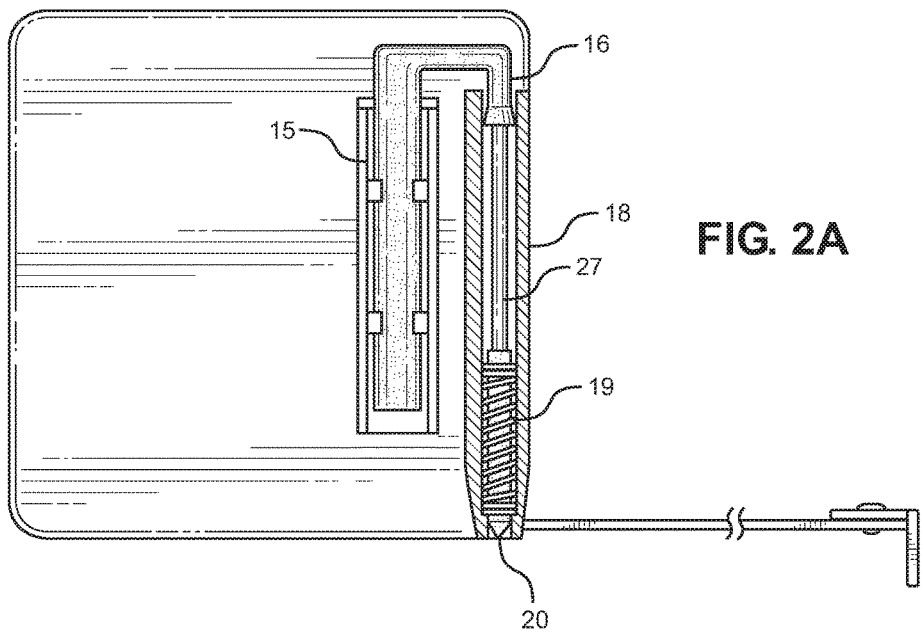
FIG. 2A shows a cross-sectional view of an embodiment of the tape measure in combination with a marker in a retracted position.

A cartridge 18 is integrally attached to the lateral portion 12 of the measuring tape housing 11. The cartridge 18 comprises a hollow interior configured to receive a complementary ink cartridge or marker 20. In the illustrated embodiment, the cartridge 18 is a hollow, tubular member that extends from along the lateral portion 12 of the measuring tape housing 11 to a lower portion 13 thereof. The cartridge 18 is open at both ends so that an arm 16 and the marker 20 can extend therethrough. In some embodiments, the cartridge 18 is arranged in a vertical orientation. The arm 16 is slidably disposed within a track (as shown in FIG. 2A, 15), wherein the track is affixed to the lateral portion 12 of the measuring tape housing 11. The track and arm 16 are protected against external interference by a flexible cover 25, wherein the flexible cover 25 is configured to allow actuation of the arm 16 between an extended position and a retracted position. The arm 16 extends through the cartridge 18 and is operationally connected to a marker 20 via a spring (as shown in FIG. 2A, 19). The arm 16 is an elongated member slidably disposed within the track wherein a protrusion extends perpendicularly outward from the elongated member, the protrusion perpendicularly connected to a marker 20 that extends through the cartridge 18.

Figure 2B:
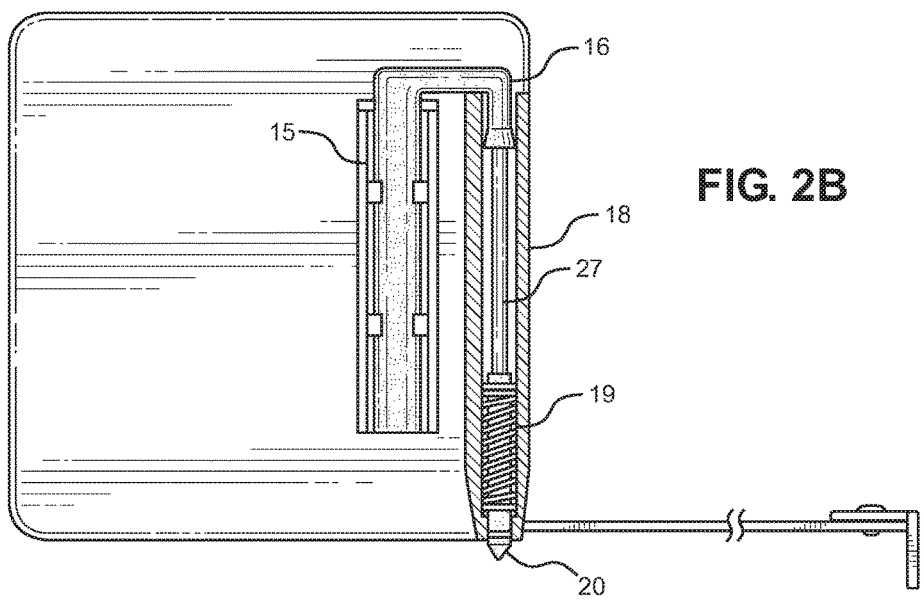
FIG. 2B shows a cross-sectional view of an embodiment of the tape measure in combination with a marker in an extended position.

Referring now to FIGS. 2A and 2B, there are shown cross-sectional views of an embodiment of the tape measure in combination with a marker in an extended and retracted position, respectively. The spring 19 is housed in the cartridge 18. The arm 16 provides an active position and an inactive position via the spring 19. In the active position, the arm 16 slides along the track 15 such that the marker 20 is extended downwardly by the pressure applied by the spring 19. In the inactive position, the spring 19 is biased to a retracted position, wherein the marker 20 is housed within the cartridge 18. The spring 19 is housed in the cartridge 18 to secure and position and/or urge the marker 20 into engagement with a writing surface.

The marker 20 is removably secured within the cartridge 18. The marker 20 is operationally attached to the arm 16 via the spring 19. The marker 20 is movable separately and independently from the measuring tape by selectively lowering the arm 16 to lock the marker 20 in an extended position via the spring 19.

The cartridge 18 can include a removable ink cartridge. The removable ink cartridge supplies ink to the marker 20 located at a distal end 27 of the removable ink cartridge. The marker 20 can include a felt tip pen. It is also contemplated that the marker 20 is an ink pen, lead pencil, colorant, or other ink dispensing apparatus.

The arm 16 is lowered to extend the marker 20 from the measuring tape housing 11. In an extended position, the felt tip pen aligns with a measurement line (as shown in FIG. 1, 26) at the front portion of the measuring tape housing. The tip of the marker 20 is flush against a writing surface and the measuring tape housing is moved to mark the surface. The marking indicates the measured length by the tape measurer. Additionally, the spring 19 is biased to a retracted position, wherein the marker 20 is contained within the cartridge 18.

In an alternate embodiment, the cartridge 18 further comprises a ball and a cam shaft. The ball is constrained within the cam shaft. In a retracted position, the cam shaft is at its highest point and the ball is in the lowest point in the cam. When the arm 16 is lowered, the cam shaft moves downward and the ball moves up the cam shaft and rests in a groove of the cam shaft. The force from the spring 19 holds the ball in place within the cam shaft and keeps the removable ink cartridge and marker 20 in an extended position.

Figure 3:
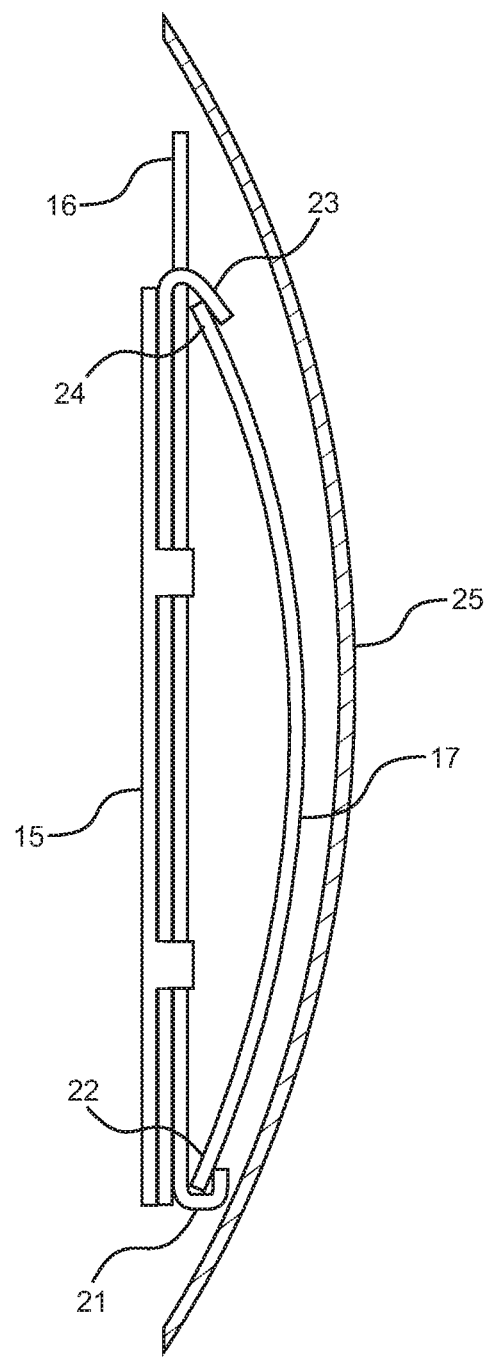
FIG. 3 shows a side view of an embodiment of the track, arm, and tension member assembly of the tape measure in combination with a marker.

Referring now to FIG. 3, there is shown a side view of an embodiment of the track, arm, and tension member assembly of the tape measure in combination with a marker. In the illustrated embodiment, the arm 16 is slidably disposed within the track 15, wherein the arm 16 is configured to move between an extended position and a retracted position. A tension member 17 is disposed about the track 15 and the arm 16, wherein the tension member 17 is configured to slide the arm 16 along the track 15 when the tension member 17 is depressed. In the illustrated embodiment, the arm 16 further comprises a first lip 22, wherein the lower end 22 of the tension member 17 is engaged with the first lip 22. The track 15 further comprises a second lip 23, wherein an upper end 24 of the tension member 17 is engaged with the second lip 23. As the track 15, and therefore the second lip 23, is permanently affixed to the lateral side of the measuring tape housing, the force of depressing the tension member 17 is transferred to the first lip 22, which in turn slides the arm 16 along the track 15. This lowers the arm 16, allowing the marker to extend through the cartridge. A flexible cover 25 extends over the track 15, arm 16, and tension member 17 assembly. In this way, the operable components of the assembly are protected against external interference, such as debris or dirt fouling the track 15.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tape measure in combination with a marker, comprising:
   a measuring tape housing having a lateral portion, a lower portion, and a front portion;
   a track affixed to the lateral position;
   an arm slidably disposed within the track;
   a tension member having an arcuate shape, wherein the tension member is configured to slide the arm towards the lower portion when depressed;
   a cartridge integrally attached to the lateral portion of the measuring tape housing, wherein the arm extends through the cartridge;
   a spring housed within the cartridge;
   a marker removably secured within the cartridge, wherein the marker is operationally attached to the arm;
   wherein the marker is movable separately and independently from the measuring tape housing by selectively depressing the tension member.

2. The tape measure in combination with a marker of claim 1, wherein the arm further comprises a first lip configured to engage with a lower end of the tension member when the tension member is depressed.

3. The tape measure in combination with a marker of claim 1, wherein the track further comprises a second lip configured to prevent an upper end of the tension member from moving.

4. The tape measure in combination with a marker of claim 1, further comprising a flexible cover configured to overlap the lateral side such that the tension member and arm are protected from external interference.

5. The tape measure in combination with a marker of claim 1, wherein the marker is spring biased to a retracted position within the cartridge.

6. The tape measure in combination with a marker of claim 1, wherein the marker comprises a felt tip pen.

7. The tape measure in combination with a marker of claim 1, wherein the marker aligns with a measurement line at the front portion of the tape measure housing when in the extended position.

8. The tape measure in combination with a marker of claim 1, wherein the cartridge includes an ink cartridge.

9. The tape measure in combination with a marker of claim 8, wherein the marker is disposed at a distal end of the removable ink cartridge.

* * * * *